(12) United States Patent
Flender et al.

(10) Patent No.: US 8,757,888 B2
(45) Date of Patent: Jun. 24, 2014

(54) SHAFT/BEARING ARRANGEMENT

(71) Applicant: Mahle International GmbH, Stuttgart (DE)

(72) Inventors: Thomas Flender, Eberdingen (DE); Antonio Menonna, Ditzingen (DE); Falk Schneider, Korntal-Muenchingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/714,376

(22) Filed: Dec. 13, 2012

(65) Prior Publication Data

US 2013/0156359 A1 Jun. 20, 2013

(30) Foreign Application Priority Data

Dec. 14, 2011 (DE) .......................... 10 2011 088 603

(51) Int. Cl.
*F16C 43/04* (2006.01)

(52) U.S. Cl.
USPC .......................................... 384/560; 384/585

(58) Field of Classification Search
USPC ......... 384/457, 523, 537, 559, 560, 456, 572, 384/584, 585; 123/90.6, 192.2; 29/898.06, 29/898.061, 898.062, 898.07
See application file for complete search history.

(56) References Cited

U.S. PATENT DOCUMENTS

| | | | |
|---|---|---|---|
| 7,992,533 B2* | 8/2011 | Vogel et al. | 123/90.6 |
| 8,157,451 B2* | 4/2012 | Solfrank et al. | 384/558 |
| 8,312,855 B2* | 11/2012 | Mederer | 123/192.2 |
| 8,585,299 B2* | 11/2013 | Hess et al. | 384/565 |
| 2011/0030643 A1* | 2/2011 | Tisch | 123/192.2 |
| 2011/0155089 A1 | 6/2011 | Mederer | |
| 2011/0247581 A1 | 10/2011 | Trieschmann et al. | |
| 2012/0037103 A1 | 2/2012 | Schneider et al. | |
| 2012/0255170 A1 | 10/2012 | Flender et al. | |

FOREIGN PATENT DOCUMENTS

| | | |
|---|---|---|
| DE | 102006036851 A1 | 6/2007 |
| DE | 102006004726 A1 | 8/2007 |
| DE | 102007024092 A1 | 11/2008 |
| DE | 102007037287 A1 | 2/2009 |
| DE | 102009009664 A1 | 8/2010 |
| DE | 102010005874 A1 | 7/2011 |
| EP | 2189549 A1 | 5/2010 |
| EP | 2302241 A1 | 3/2011 |
| WO | WO-00/19117 A1 | 4/2000 |

OTHER PUBLICATIONS

English abstract for DE-102006004726.
English abstract for DE-102006036851.

(Continued)

*Primary Examiner* — Phillip A Johnson
(74) *Attorney, Agent, or Firm* — Rader, Fishman & Grauer PLLC

(57) ABSTRACT

A shaft may have functional elements arranged thereon and at least one bearing point. At least one rolling bearing with rolling bodies may be arranged between the shaft and the at least one bearing point, the bearing having at least one rolling body cage configured to accommodate the rolling bodies and an outer ring. The rolling body cage may be fixed at least one of directly and indirectly to the shaft by a carrier ring and the outer ring may be fixed in the bearing point. The carrier ring may include the rolling body cage fixed thereon, the cage having a greater radial extent than the functional elements. The carrier ring may have a radial extent smaller than the greatest radial extent of one of the functional elements.

20 Claims, 3 Drawing Sheets

(56) References Cited

OTHER PUBLICATIONS

English abstract for DE-102010005874.

EP Search Report for EP12196537.0.

\* cited by examiner

SHAFT/BEARING ARRANGEMENT

CROSS-REFERENCE TO RELATED APPLICATION

This application claims priority to German Patent Application 10 2011 088 603.6, filed on Dec. 14, 2011, which is hereby incorporated by reference in its entirety.

TECHNICAL FIELD

The present invention relates to a shaft/bearing arrangement having a shaft with functional elements arranged thereon and at least one bearing point for the radial tunnel bearing of the shaft. The invention also relates to a shaft for such a shaft/bearing arrangement.

BACKGROUND

DE 10 2007 024 092 A1 discloses a camshaft for internal combustion engines of motor vehicles, which is mounted on a cylinder head housing by means of at least one roller bearing. Also provided is at least one axial bearing, which bears the camshaft in the axial direction and is formed as a ball bearing or likewise as a roller bearing. This should achieve particularly smooth bearing of the camshaft.

DE 10 2010 005 874 A1 discloses a camshaft with rolling bearings, the rolling bearings comprising in each case at least one rolling bearing insert and one rolling bearing outer ring. A fixing element is provided on the outer circumference of the rolling bearing outer ring, which fixing element is suitable for fixing the rolling bearing in a bearing holder of a motor vehicle cylinder head. An installation arrangement for a rolling bearing is also described for arrangement on a camshaft which can be deformed by internal high pressure.

Camshafts have previously often been mounted in a tunnel bearing, that is, in closed bearing points/bearing blocks, of a cylinder head, a rolling bearing usually being fixed in the respective bearing block for easy bearing of the camshaft. To allow the pre-assembled camshaft to be introduced into the individual bearing points, a carrier ring, by means of which the camshaft would subsequently be mounted on the bearing block by means of the associated rolling bearing, always had to be bigger in maximum diameter than all the functional elements on the camshaft, for example the cams. If the cams were radially bigger than the carrier ring, it would not have been possible to insert the camshaft into the individual bearing points/bearing blocks. The large diameter of the carrier ring which resulted from this meant however that a large amount of material was needed in this region, as a result of which the camshaft was comparatively heavy. Moreover, a considerable installation space had to be reserved.

SUMMARY

The present invention is therefore concerned with the problem of specifying an improved embodiment for a shaft/bearing arrangement, which in particular has a compact and weight-optimised design.

This problem is solved according to the invention by the subject matter of the independent claims. Advantageous embodiments of the invention are the subject of the dependent claims.

The present invention is based on the general concept of dividing the rolling bearing, which was previously fixed in the respective bearing points/bearing blocks, for bearing a shaft, for example for bearing a camshaft or balance shaft, and of fastening a rolling body cage which accommodates the rolling bodies of the rolling bearing onto a carrier ring on the shaft, and of fixing only one outer ring in the bearing points or in the cylinder head itself. The maximum radial extent of the carrier ring including the rolling body cage fixed thereon must still be greater than the maximum radial extent of all the functional elements threaded onto the shaft, for example cams or balance weights, it now being possible for the carrier ring to be reduced in radius by the radial thickness of the rolling bearing cage and still fit through the respective bearing points/bearing blocks. A radial extent of the carrier ring is according to the invention smaller than the greatest radial extent of one of the functional elements. Consequently, it is conceivable in the shaft/bearing arrangement according to the invention to mount a carrier ring on the shaft, the outer diameter/radial extent of which is at least slightly smaller than the maximum radial extent of an adjacent functional element, for example a cam, the radial extent of the carrier ring together with the rolling body cage mounted thereon being greater than the maximum radial extent of the functional element, that is, for example of the cam, so that the shaft can be guided without problems through the associated bearing points/bearing blocks, as it is now enlarged in inner diameter by the rolling body cage, as this is fixed onto the carrier ring of the shaft. The reduction of the diameter of the carrier ring arranged on the shaft means that the weight thereof and thus the total weight of the shaft or shaft/bearing arrangement can be reduced. The solution according to the invention means a complete reversal of the thinking previously used in this field, as the rolling bearing is now no longer pre-mounted in the bearing block in its entirety, but is divided up, on the outer ring which is still fastened in the bearing block on one side and on the rolling body cage which is fixed on the carrier ring of the shaft on the other side. This means that the carrier ring can be made smaller and thus the shaft can be reduced in weight.

Expediently, the shaft is formed as a camshaft or balance shaft and the functional elements are formed as cams or balance weights. Even this list, which is by no means exhaustive, shows how flexible the application of the shaft/bearing arrangement according to the invention is, so it can be used not only within the context of the camshafts or balance shafts in internal combustion engines, but generally for all conceivable tunnel-mounted shafts.

In a further advantageous embodiment of the solution according to the invention, the rolling body cage is fixed to the carrier ring by means of fixing elements. The fixing elements can be part of the carrier ring or part of the rolling body cage, in the latter case it being possible for the fixing elements to be configured for example as simple, bendable tabs. If the rolling body cage consists of plastic, the fixing elements can be injection-moulded in a cost-effective manner. If the fixing elements are for example part of the carrier ring, they can be produced by shaping the carrier ring, for example by means of corresponding edge crimping. The carrier ring itself is usually fixed, for example by means of a thermal joint, on a tube of the camshaft or the shaft generally or is alternatively formed integrally with the shaft. Alternatively, the fixing elements can of course be formed as separate fixing rings which are compressed with the shaft or likewise connected by means of a thermal joint. Configuration of the fixing elements as separate spacer rings, which fix the carrier ring and/or the rolling body cage with respect to the functional elements, for example by means of adjacent cams, is also conceivable. All of the listed embodiments allow at least pre-positioning of the rolling body cage or of the carrier ring, it being possible for final fixing to take place for example by means of the bendable lateral tabs arranged on the rolling body cage. In addition to such fixing elements, the application of a corresponding groove running in the circumferential direction on the carrier ring or in the region of a balance weight is also conceivable, the associated rolling body cage then being inserted into the groove in the carrier ring or in the balance weight and thereby being fixed in the axial direction. The groove then forms the actual fixing elements.

Further important features and advantages of the device according to the invention can be found in the subclaims, drawings and the associated description of the figures on the basis of the drawings.

It is to be understood that the previously mentioned features and the features which are still to be mentioned below can be used not only in the respectively specified combination, but also in other combinations or alone, without departing from the scope of the present invention.

Preferred exemplary embodiments of the invention are shown in the drawings and are explained in more detail in the description below.

BRIEF DESCRIPTION OF THE DRAWINGS

In the figures.

DETAILED DESCRIPTION

Figure 1:
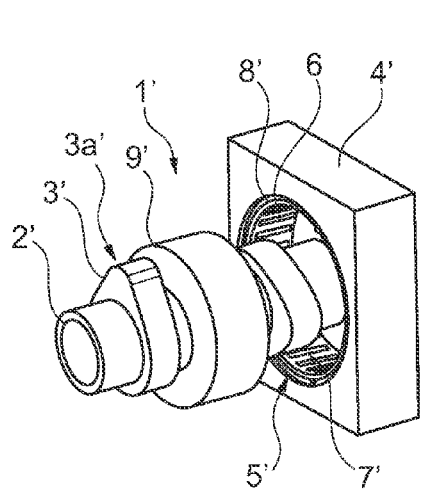
FIG. 1 schematically shows a shaft/bearing arrangement having a tunnel-mounted camshaft according to the prior art, FIG. 2 schematically shows a diagram as in FIG. 1 but with a shaft/bearing arrangement according to the invention, FIG. 3 schematically shows a view and a sectional diagram through a shaft formed as a balance shaft of a shaft/bearing arrangement according to the invention, FIG. 4 schematically shows an associated shaft according to the invention, which is formed as a balance shaft, FIG. 5 schematically shows a diagram as in FIG. 4 but with a mounted rolling body cage, FIG. 6 schematically shows a sectional diagram and a view of a shaft/bearing arrangement according to the invention with a balance shaft and before actual assembly, that is, before the rolling body cage is inserted into an outer ring of the associated rolling body, FIG. 7 schematically shows a diagram as in FIG. 6 but shortly before the rolling body cage is inserted into the outer ring of the associated rolling bearing, FIG. 8 schematically shows a diagram as in FIG. 6 or 7 but with a camshaft, FIGS. 9a-d schematically show sectional diagrams through different possible embodiments of the shaft/bearing arrangement according to the invention.

According to FIG. 1, a previously known shaft/bearing arrangement 1' has a shaft 2' with functional elements 3a' arranged thereon, in this case cams 3', and at least one bearing point/bearing block 4' for the radial tunnel bearing of the shaft 2'. At least one rolling bearing 5' with rolling bodies 6', for example balls, rollers or needles, is arranged between the shaft 2' and the bearing block 4', which bearing comprises at least one rolling body cage 7' which accommodates these rolling bodies 6' and an outer ring 8'. The term "bearing point" is used in this case to mean the same thing as the term "bearing block". The whole rolling bearing 5', that is, both the rolling body cage 6' and the outer ring 8', is arranged in the bearing block 4'. To insert the shaft 2' into the bearing block 4', it is therefore necessary for the cams 3' to have a maximum radial extent which is smaller than an inner diameter of the rolling bearing 5', so that the shaft 2' can be inserted into the bearing block 4' without bumping and a carrier ring 9' can be brought into contact with the rolling bodies 7' to fulfil the actual bearing function. The carrier ring 9' must therefore have a maximum radial extent which is greater than a maximum radial extent of each cam 3', so that the through-opening in the bearing block 4' is always so large that the cam 3' can be pushed through without bumping. Generally, however, this bearing solution requires a comparatively large carrier ring 9', which in turn requires a lot of material and thereby means a comparatively heavy shaft 2'.

According to the invention, in a shaft/bearing arrangement 1 falling under the invention, the rolling body cage 6 is therefore fixed not together with the outer ring 8 in the bearing block 4, but separately and individually onto the carrier ring 9 of the shaft 2, whereas the outer ring 8 is still fixed in the bearing block 4, for example by means of a thermal joint (shrink fit) or by means of compression. In order nevertheless to allow the functional elements 3a and thus the shaft to be pushed through the bearing block 4 without bumping, the carrier ring 9 including the rolling body cage 6 fixed thereon must form the greatest radial extent of the shaft 2, that is, in particular have a greater radial extent than the adjacent cams 3. In the shaft/bearing arrangement 1 according to the invention, a part of the carrier ring 9 is thus replaced by the rolling body cage 6, as a result of which the carrier ring 9 can be formed smaller and thus lighter overall. Compared to shaft/bearing arrangements 1' known previously from the prior art (cf. FIG. 1), the shaft/bearing arrangement 1 according to the invention has a more compact construction and a much reduced weight and also much improved replaceability.

Figure 2:
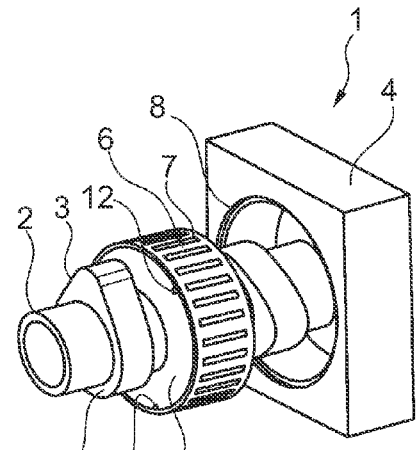
Figure 4:
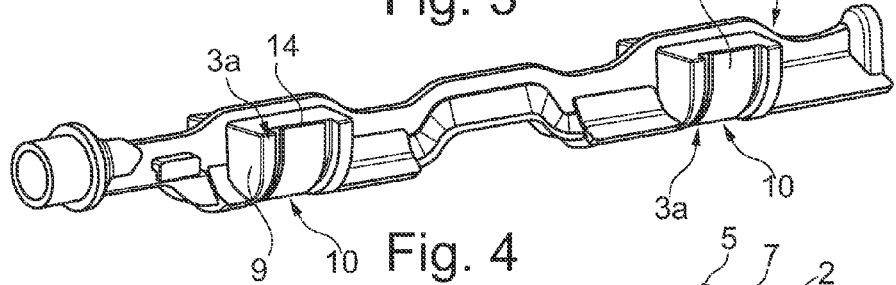
Figure 5:
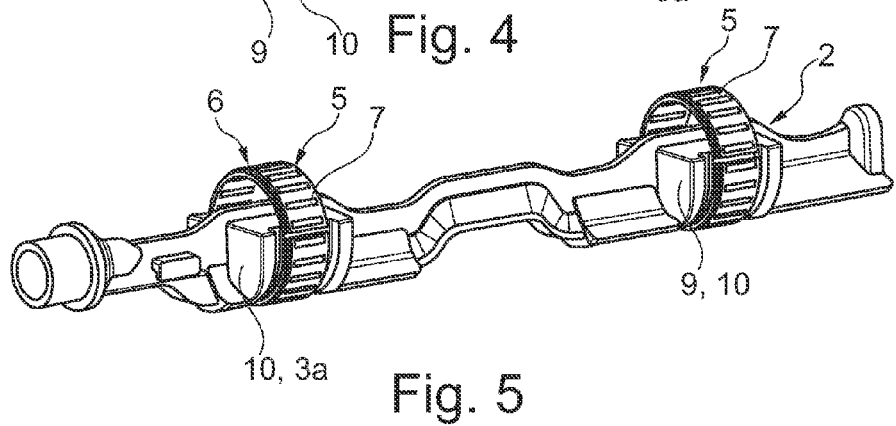
Figure 6:
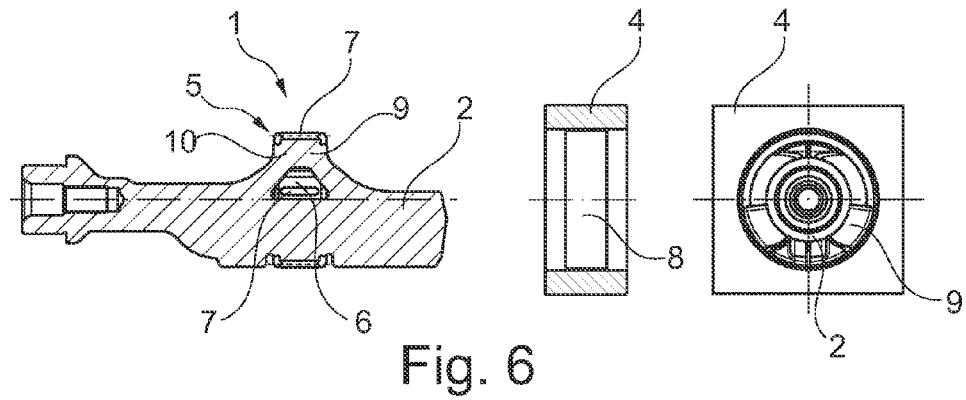
Figure 7:
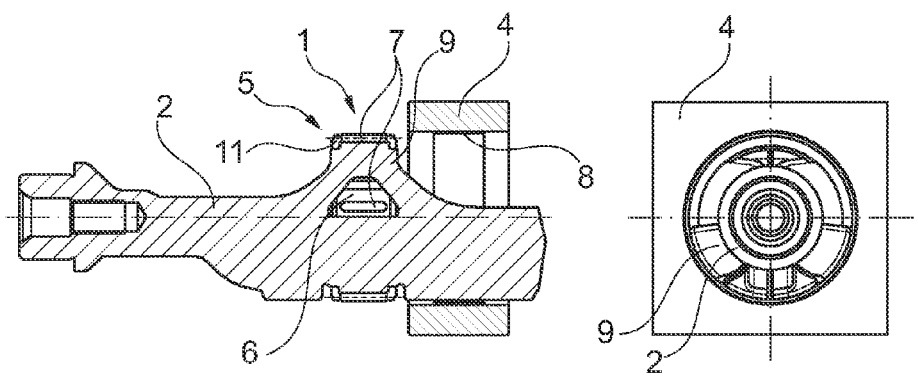
Figure 8:
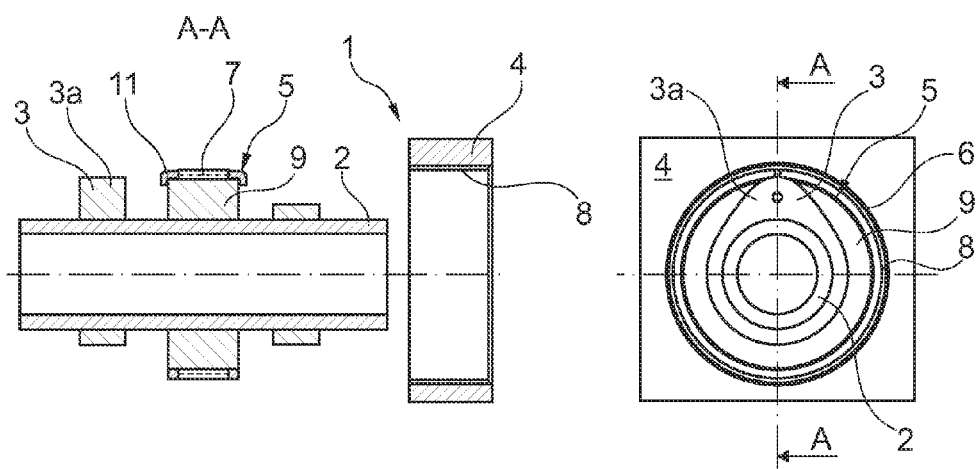

The shaft 2 can for example be formed as a camshaft, as is shown in particular in FIGS. 2 and 8, or as a balance shaft, as is shown for example according to FIGS. 3 to 7. The shaft 2 can in particular be formed as a built camshaft or as a forged camshaft or as a cast camshaft. In the first case, the functional elements 3a are formed as cams 3, whereas in the second case they are usually formed as balance weights 10. As can be seen in FIGS. 2, 6 and 7, the bearing point 4 is usually formed as a closed bearing block and integrated in a cylinder head (not shown), as a result of which the shaft 2 must be mounted by lateral insertion.

Figure 9A:
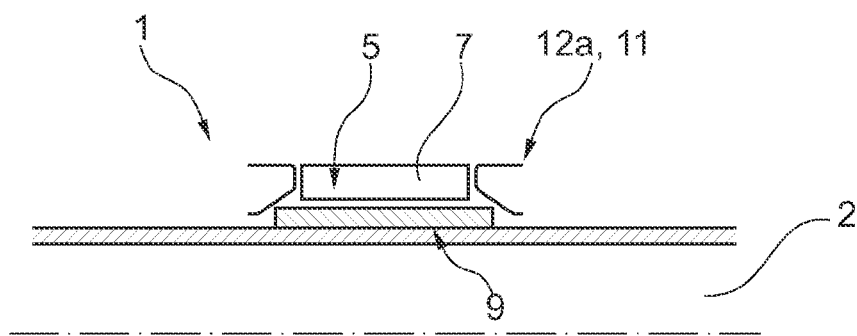
Figure 9B:
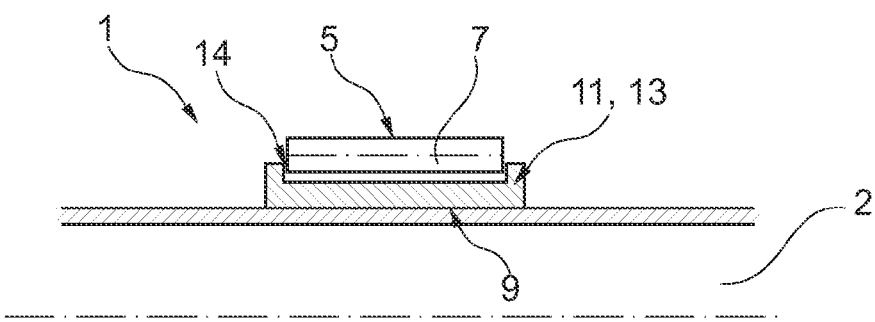
Figure 9C:
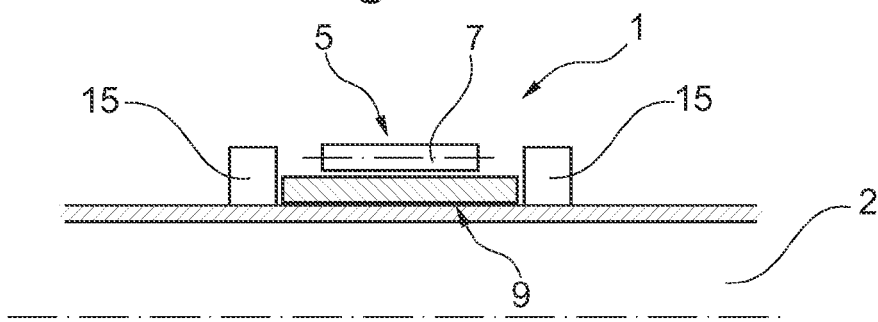
Figure 9D:
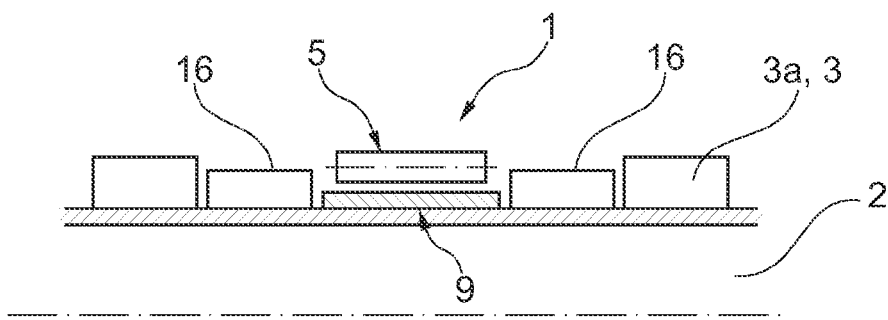

The carrier ring 9 can be fixed on the shaft 2 for example by means of a press fit or a thermal joint, for example a shrink fit. A single-part or single-piece configuration of the carrier ring 9 with the shaft 2 is also conceivable. The rolling body cage 6 however is fixed to the carrier ring 9 usually by means of fixing elements 11, which are for example formed in the manner of tabs 12 and which are fixed laterally to the carrier ring 9 by bending, as is shown in FIG. 2. It is generally also conceivable for lateral clip elements 12a to be provided on the rolling body cage 6, which assume the function of the fixing elements 11 and fix the rolling body cage 6 to the carrier ring 9, as shown in FIG. 9a. If FIG. 9b is considered, it can be seen that lateral fixing of the rolling body cage 6 can also take place by means of lateral crimping 13 of the carrier ring 9, in this case the carrier ring 9 having a groove 14 in which the rolling body cage 6 and thus also the rolling bodies 7 are arranged. The lateral crimping thus forms the edges of the groove 14 and prevents axial displacement of the rolling body cage 6. FIG. 9c shows a further alternative embodiment of the solution according to the invention, in which the fixing elements 11 are formed as separate fixing rings 15, which for their part are connected fixedly to the shaft 2 and thereby fix both the rolling bodies 7 and the rolling body cage 6 to the carrier ring 9. Fixing can take place for example by means of a shrink fit. Alternatively, the fixing rings 15, that is, the fixing elements 11, can also be formed as spacer rings 16, as is shown for example in FIG. 9d, in this case the rolling body cage 6 being held in position with respect to adjacent functional elements 3a, for example with respect to adjacent cams 3, by means of the spacer rings 16. Common to all the embodiments of FIGS. 9a to 9d is that the fixing elements 11 provide pre-positioning and fixing of the rolling body cage 6 when the shaft 2 is inserted into the respective bearing blocks 4.

Figure 3:
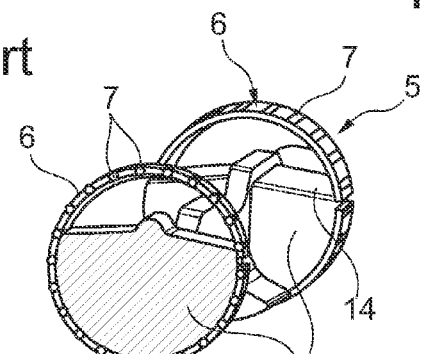

A groove 14 for fixing the rolling body cage 6 can be seen for example in the shaft 2 according to FIGS. 3 to 5, in this case the groove 14 being arranged in the region of the balance weights 10.

According to FIG. 3, a sectional diagram through a rolling body cage 6 in the region of the balance weight 10 is shown in the foreground and a view of the same point is shown obliquely behind it. It can also be clearly seen that the rolling body cage 6 is set deep in the groove 14 at the balance weight 10, preferably so deep that preferably only the rolling bodies 7 look radially out of the groove 14 and thereby allow bearing on the outer ring 8.

If FIG. 8 is considered more closely, it can be seen that a maximum radial extent (diameter) of the carrier ring 9 is smaller than a maximum radial extent of a functional element 3a, for example, a cam 3, whereas the maximum radial extent (diameter) of the carrier ring 9 together with the rolling body cage 6 is greater than the radial extent of the cam 3, so that the shaft 2, in this case the camshaft, can be inserted comparatively simply into the bearing block 4, without there being a risk of the shaft 2 bumping into the cams 3, as the latter are radially smaller than the adjacent carrier rings 9 including the rolling body cage 6. Assembly is considerably simplified overall, and a reduction in the radial dimensions of the carrier ring 9 can also be achieved, as a result of which the weight of the latter can be reduced. Such a reduction in weight has an effect on fuel consumption and volume of emissions in the long term, if the shaft 2 is used for example in an internal combustion engine of a motor vehicle.

With the shaft/bearing arrangement 1 according to the invention, the insertion of the shaft 2 into the bearing point 4 or into the bearing block 4 requires that the rolling body cage 6 be fixed to the associated carrier ring 9 at least in the axial direction, it being possible for the carrier rings 9 themselves to be balance weights 10 in shafts 2 configured as balance shafts.

The invention claimed is:

1. A shaft arrangement comprising: a shaft with functional elements arranged thereon and at least one bearing point, wherein
   at least one rolling bearing with rolling bodies is arranged between the shaft and the at least one bearing point, the bearing having at least one rolling body cage configured to accommodate the rolling bodies and an outer ring,
   the rolling body cage fixed at least one of directly and indirectly to the shaft by a carrier ring, and wherein the outer ring is fixed in the bearing point,
   the carrier ring including the rolling body cage fixed thereon, the cage having a greater radial extent than the functional elements, and
   the carrier ring having a radial extent smaller than the greatest radial extent of one of the functional elements.

2. The shaft arrangement according to claim 1, wherein the shaft is formed as a camshaft and the functional elements are formed as cams.

3. The shaft arrangement according to claim 2, wherein the shaft is formed as at least one of a built camshaft as a forged camshaft, and as a cast camshaft.

4. The shaft arrangement according to claim 1, wherein the shaft is formed as a balance shaft and the functional elements are formed as balance weights.

5. The shaft/bearing arrangement according to claim 4, wherein the rolling body cage is inserted into at least one of a groove in the carrier ring and the balance weight and thereby fixed.

6. The shaft arrangement according to claim 1, wherein the at least one bearing point is formed as a closed bearing block.

7. The shaft arrangement according to claim 1, wherein the outer ring is fixed in the bearing block by thermal joint.

8. The shaft arrangement according to claim 1, wherein the carrier ring is at least one of: fixed on the shaft (2) by means of a thermal joint, formed integrally with the shaft, and wherein the rolling body cage is fixed to the carrier ring by fixing elements.

9. The shaft/bearing arrangement according to claim 8, wherein the fixing elements are at least one of: part of at least one of the carrier ring and the rolling body cage, formed as separate fixing rings which are at least one of compressed with the shaft and connected by means of a thermal joint, and formed as separate spacer rings configured to fix the rolling body cage to the carrier ring.

10. The shaft arrangement according to claim 1, wherein the rolling bodies are formed as at least one of needles, rollers and balls.

11. A bearing arrangement, comprising:
   a shaft with functional elements arranged thereon and at least one bearing point, wherein at least one rolling bearing with rolling bodies is arranged between the shaft and the at least one bearing point, the bearing having at least one rolling body cage configured to accommodate the rolling bodies and an outer ring,
   the rolling body cage fixed at least one of directly and indirectly to the shaft by a carrier ring and wherein the outer ring is fixed in the bearing point,
   the carrier ring including the rolling body cage fixed thereon, the cage having a greater radial extent than the functional elements, and
   the carrier ring having a radial extent smaller than the greatest radial extent of one of the functional elements.

12. The bearing arrangement according to claim 11, wherein the shaft is formed as a camshaft and the functional elements are formed as cams.

13. The bearing arrangement according to claim 12, wherein the shaft is formed as at least one of a built camshaft, as a forged camshaft, and as a cast camshaft.

14. The bearing arrangement according to claim 11, wherein the shaft is formed as a balance shaft and the functional elements are formed as balance weights.

15. The bearing arrangement according to claim 14, wherein the rolling body cage is inserted into at least one of a groove in the carrier ring and the balance weight and thereby fixed.

16. The bearing arrangement according to claim 11, wherein the bearing point is formed as a closed bearing block.

17. The bearing arrangement according to claim 11, wherein the outer ring is fixed in the at least one bearing point by a thermal joint.

18. The bearing arrangement according to claim 11, wherein the carrier ring is at least one of:
   fixed on the shaft by means of a thermal joint, and
   formed integrally with the shaft, and wherein the rolling body cage is fixed to the carrier ring by fixing elements.

19. The bearing arrangement according to claim 18, wherein the fixing elements are at least one of:

part of at least one of the carrier ring and the rolling body cage, formed as separate fixing rings which are at least one of compressed with the shaft and connected by means of a thermal joint, and formed as separate spacer rings configured to fix the rolling body cage to the carrier ring.

20. The bearing arrangement according to claim 11, wherein the rolling bodies are formed as at least one of needles, rollers and balls.

* * * * *

UNITED STATES PATENT AND TRADEMARK OFFICE
CERTIFICATE OF CORRECTION

PATENT NO.       : 8,757,888 B2
APPLICATION NO.  : 13/714376
DATED            : June 24, 2014
INVENTOR(S)      : Flender et al.

It is certified that error appears in the above-identified patent and that said Letters Patent is hereby corrected as shown below:

In the Claims:

At column 5, claim number 3, line number 66, insert a --,-- after the word camshaft.

It should read as follows:

… a built camshaft, as a forged…

At column 6, claim number 7, line number 11, insert --a-- before thermal joint.

It should read as follows:

… by a thermal joint.

At column 6, claim number 9, line number 17, delete "/bearing".

It should read as follows:

The shaft arrangement according…

Signed and Sealed this
Sixth Day of January, 2015

Michelle K. Lee
*Deputy Director of the United States Patent and Trademark Office*